R. P. DECKER.
PORTABLE MILLING MACHINE.
APPLICATION FILED APR. 18, 1908.
942,168.
Patented Dec. 7, 1909.
3 SHEETS—SHEET 1.
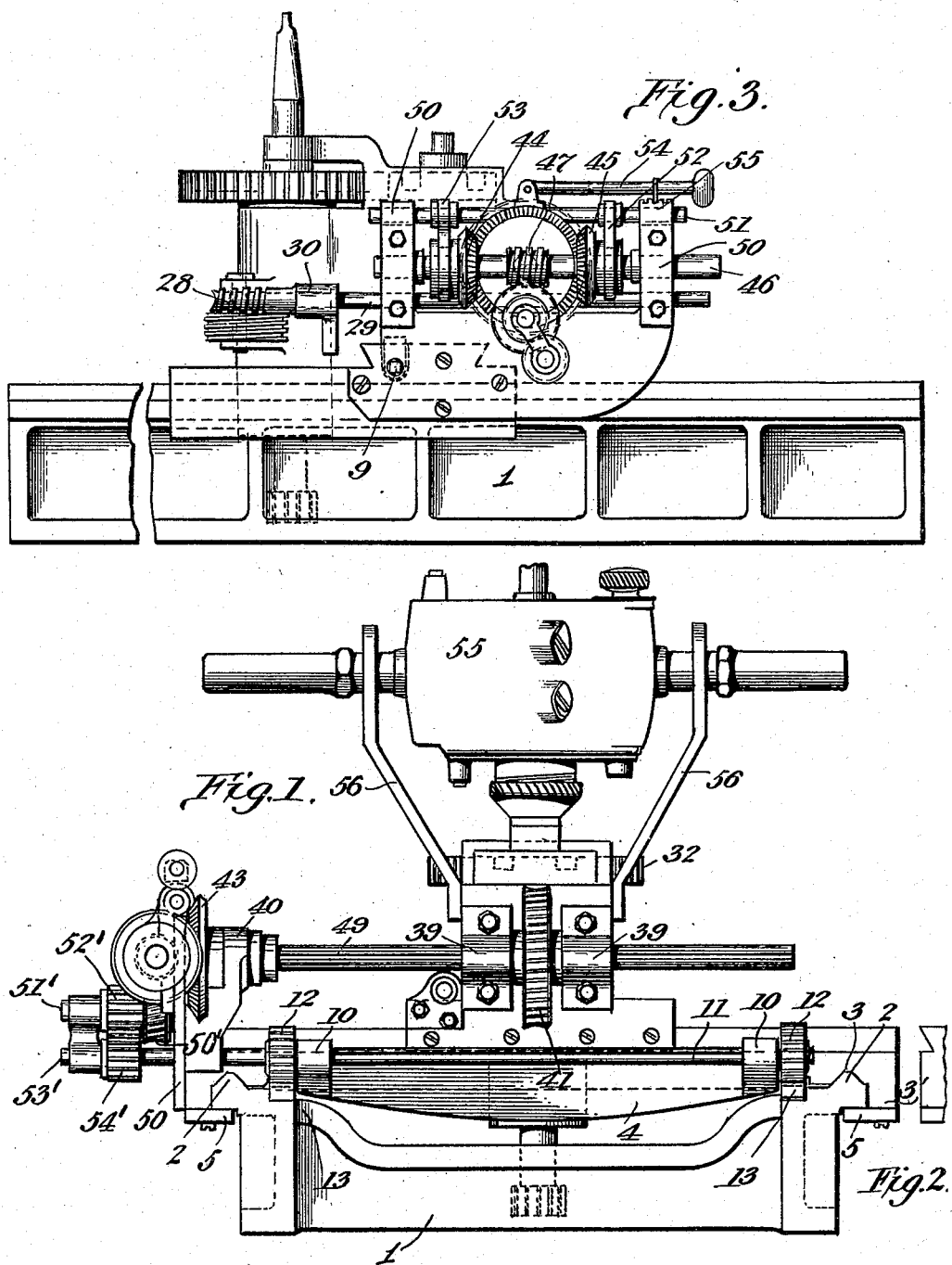
WITNESSES:
INVENTOR.
Richard Peter Decker
BY
G. Howlett Davis
ATTORNEY.

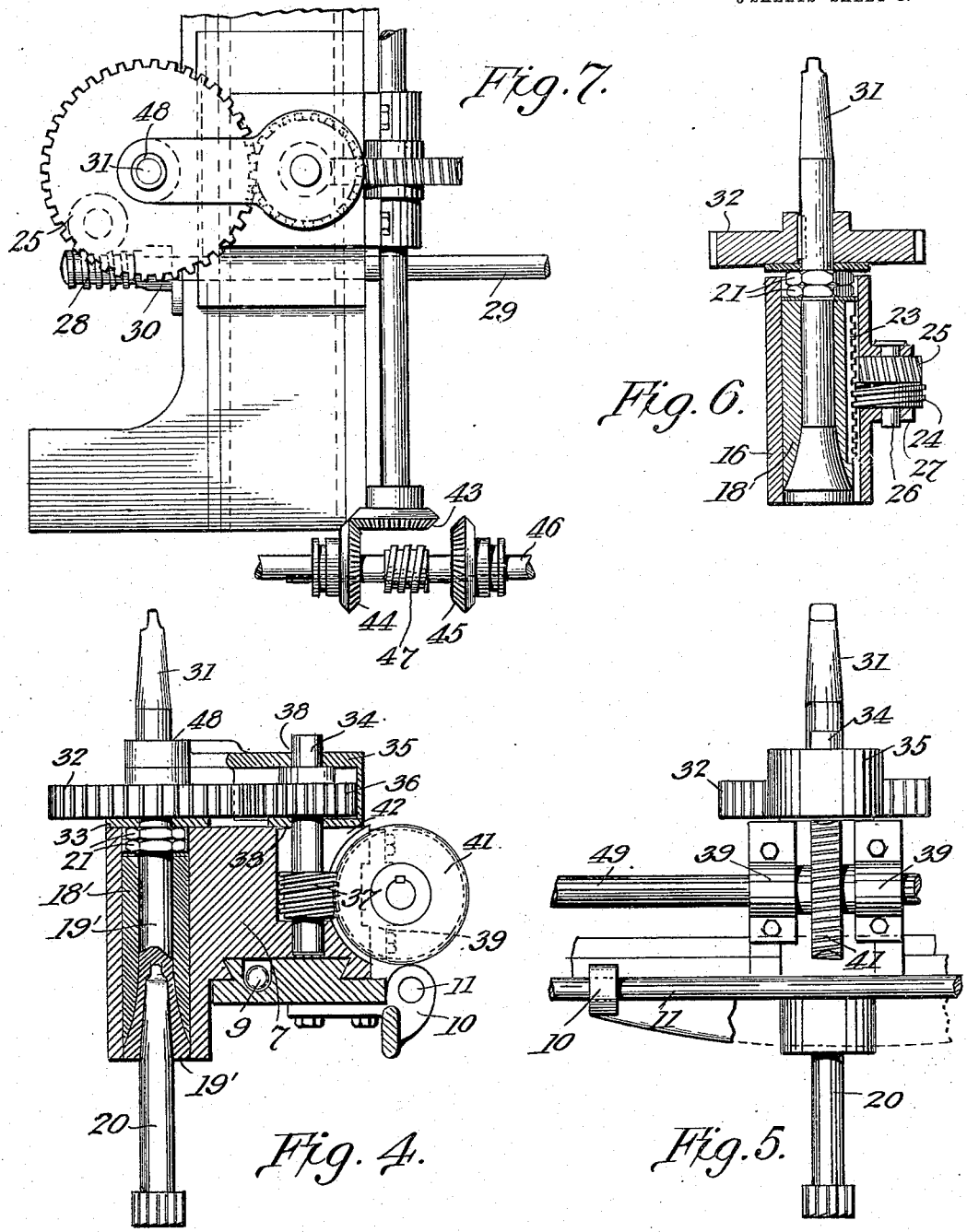

R. P. DECKER.
PORTABLE MILLING MACHINE.
APPLICATION FILED APR. 18, 1908.
942,168.
Patented Dec. 7, 1909.
3 SHEETS—SHEET 3.
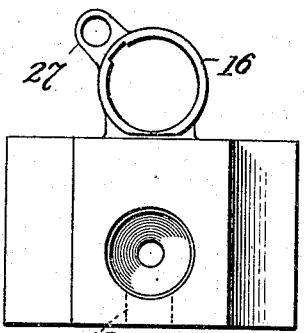
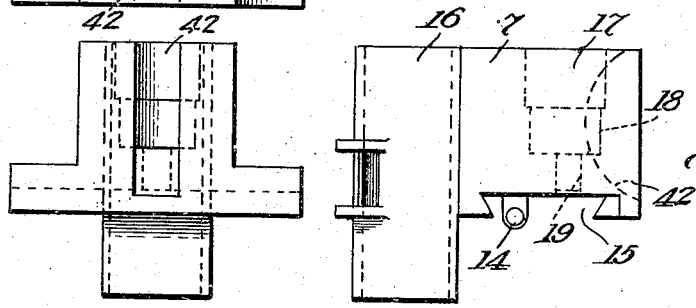
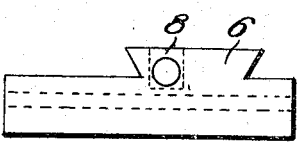
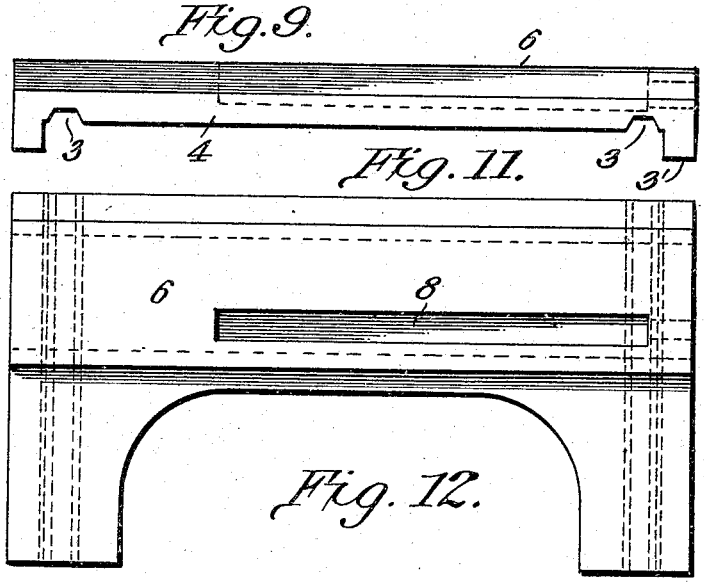
WITNESSES:
INVENTOR.
Richard Peter Decker
BY
*G. Howlett Davis*
ATTORNEY.

UNITED STATES PATENT OFFICE.

RICHARD PETER DECKER, OF ATLANTA, GEORGIA.

PORTABLE MILLING-MACHINE.

942,168. Specification of Letters Patent. Patented Dec. 7, 1909.

Application filed April 18, 1908. Serial No. 427,794.

*To all whom it may concern:*

Be it known that I, RICHARD PETER DECKER, a citizen of the United States, residing at Atlanta, in the county of Fulton and State of Georgia, have invented certain new and useful Improvements in Portable Milling-Machines, of which the following is a specification.

This invention pertains to milling and planing machines of that type adapted for milling or facing the ports of engine valve chests, or valve seats.

The primary object is to provide a portable self contained machine embracing both the milling mechanism and its driving motor in a single organization.

A still further object is to mount the milling tool and its operating motor on a traveling support or carriage propelled by the motor in such manner as to shift said tool to various parts of the valve chest as the work progresses.

Another object is to provide a machine of this type capable of direct application to the engine without necessitating the disassembling of the latter.

To accomplish these objects the illustrated embodiment of the invention includes substantially a frame adapted to be detachably mounted on the valve chest and supporting a main carriage which in turn supports a supplemental carriage movable transversely of the main carriage, and said supplemental carriage in turn supporting a milling tool and its operating motor which is arranged to simultaneously operate the tool and propel the main carriage.

With these and other advantages which will be pointed out in the course of the following specification, the invention embraces the structure disclosed in the accompanying drawings, wherein—

Figure 1 is an end elevation of the machine complete, with the operating motor attached. Fig. 2 is an end elevation of part of the carriage guide. Fig. 3 is a side elevation of the machine with the operating motor removed therefrom. Fig. 4 is a view partly in section of the transverse carriage with the milling tool attached. Fig. 5 is an end view of Fig. 4. Fig. 6 is a detail of the milling tool holder and driving spindle. Fig. 7 is a top plan view of the transverse carriage in position upon the lateral carriage. Fig. 8 is a top plan view of the transverse carriage. Fig. 9 is an end elevation thereof. Fig. 10 is a side elevation of the same. Fig. 11 is an end elevation of the lateral carriage. Fig. 12 is a top plan view of Fig. 11. Fig. 13 is a side elevation thereof.

In a further detailed description of the machine and its working parts, wherein like reference numerals refer to similar parts in the different figures shown, 1 designates the supporting frame or bed plate which is substantially rectangular in shape and of such dimension as will correspond approximately with the steam chest of a locomotive when the top has been removed therefrom. The upper side edges of the supporting frame 1 are provided with guides 2 upon which the ways 3 of the lateral carriage 4 are adapted to travel, and on its underside said frame or bed plate has a pair of keepers 5 bolted thereon, which keepers, by reason of their position directly beneath the ways 3, serve to hold said carriage securely in position during its reciprocations upon the bed-plate. At its rear end said carriage 4, has secured thereto by bolts or otherwise, a pair of journal boxes 10, within which the shaft 11, is journaled. Said shaft 11 is fitted at its ends with pinions 12, adapted to travel in racks 13, upon the upper face of the bed-plate 1, adjacent the guides 2, said pinions and racks being the means through which the carriage 4 is given movement.

The reciprocating carriage 4, is formed with a transverse dovetailed head or guideway 6, upon which the corresponding recess 15 of the tool carrying carriage 7 is adapted to travel and thereby give the milling tool crosswise movement. To effect this adjustment of the milling tool, the tool carrying carriage 7, has on its underside an apertured screw-threaded lug 14, which fits within the slotted opening 8, in the guideway 6, wherein it engages with the screw-threaded adjusting rod 9, journaled within said opening of the guiding head. The outer end of the adjusting screw-rod 9, is adapted to be fitted with means for turning the same to effect the desired transverse adjustment of the milling tool carrier.

The milling tool carriage 7 comprises essentially a block or body portion having an offstanding and vertically depending tubular member 16, and a recess of varying diameters 17, 18 and 19 respectively is formed within the block portion of said carriage. The tubular member 16, holds within it the milling tool and its related parts, which comprise a socket piece 18¹ which is vertically adjustable within the tube and a revoluble head 19¹ which holds the shank 20 of the milling tool. The head 19¹ fits within the socket piece 18¹ and is held in its position by a pair of nuts 21, which are located within the tube 16. To effect the adjustment of the tool holding socket 18¹ and thereby vary the depth of the cutter head, said socket 18¹ has formed therein a rack 23, the teeth of which are adapted to mesh with a worm gear 24. The worm gear 24 and a pinion 25 are keyed upon a stub shaft 26 which is journaled within the lugs 27 offsetting from the tubular member 16. The pinion 25 meshes with the worm 28 of the adjusting shaft 29, which shaft 29 is journaled within a journal box 30 upon the body of the tool carrying carriage 7, and has at its free end a hand turning wheel or any similar means for its operation. The tool holding members are slidably connected with the driving spindle 31 and said spindle has keyed thereon a driven pinion 32, which rests upon a bearing 33 upon the tubular head.

Within the recesses 17 and 18 of the cutter carriage 7 are the pinion 36 and worm gear 37 respectively, which are keyed upon the counter shaft 34, which has its bearing end journaled within the lowermost recess 19. At its upper end the shaft 34 is journaled within the bearing 33 and exposed through an opening 38 in the gear casing 35, which casing has also a similar opening 48 through which the driving spindle 31 passes. The pinion 36 meshes with the pinion 32 of the spindle 31, and with the shaft 34 and worm 37 constitute the means through which power is imparted to the driving mechanism for reciprocating and laterally moving carriage 4.

The mechanism for driving the carriage 4 in its forward and backward movement upon the bed plate 1 consists of a shaft 49 journaled within boxes 39 upon the carriage 7, and supported by an upright arm 40 carried upon one side of the frame 4. Between the journal boxes 39 of the shaft 49 is a pinion 41 splined upon said shaft which meshes with the worm 37, to facilitate which the carriage 7 is cut away at 42 adjacent the recesses 17 and 18 as indicated in Figs. 9 and 10. At one end the shaft 49 has a beveled pinion 43 adapted to mesh with either of the beveled pinions 44 or 45 splined upon shaft 46, which shaft has also a worm gear 47 keyed thereon intermediate said beveled pinions.

The shaft 46 is journaled within a pair of upright arms 50 upon one side of the carriage 4, which arms likewise have journaled therein a sliding shaft 51 that carries fixed thereon, and disposed to either side of the beveled pinions 44 and 45, clutch shifting means 52 and 53 whereby either of the pinions 44 or 45 may be thrown into or out of engagement with the beveled gear 43. The driven worm gear 47 meshes with a pinion 50′ upon a stub shaft 51′ that has also a pinion 52′ fixed thereon. Immediately under this stub shaft 51′ is the extended end 53′ of the carriage shaft 11; the pinion 52′ meshes with a pinion 54′ upon the shaft 11. As previously stated the shaft 11 has pinions 12 thereon running in racks 13 upon the bed plate 1, whereby the carriage 4 is caused to reciprocate. The control of this gearing is effected by a lever 54 which has fixed connection on the shifting bar 51, and is provided with a lock arrangement 55 so that either forward or reverse gearing may be fixedly effected, or that the gearings should run idle.

Upon the projecting spindle 31 a readily removable and portable motor 55 of any appropriate type may be placed, said spindle being secured to any turning part of the motor while the body portion thereof is held in position by a pair of bracket arms 56, rigidly fastened in an upright position to the tool carrying carriage 7. It is therefore evident that in the work for which this machine is primarily intended the motor is in such position as to be no obstruction to the machinist in charge thereby giving him entire freedom for observing and controlling the operations of the machine.

While I have shown and described the details of structure set forth in the foregoing description and appended drawings, I do not wish to be understood as bounded by such restriction but rather reserve instead the right to make such changes therein as will better adapt or simplify the machine for its purpose.

What I claim as new is:—

A machine of the type set forth comprising a bed-plate, guide members formed integral with two parallel sides thereof, racks on said sides immediately adjacent said guides, a carriage having a dovetailed head and mounted to reciprocate on the bed-plate, said carriage having grooved ways complementary to the guides of said bed-plate and means engaging under said guides whereby to hold the carriage to the bed-plate, said carriage carrying pinions engaging with the racks of the bed-plate, a second carriage mounted to reciprocate on the dovetailed head of the first named carriage, a tool holding spindle and upright arms on the second carriage, a driving motor fitting upon said spindle and supported by said upright arms, a tool carried by said spindle, and gearing connections between the spindle and the carriages whereby the same may be operated simultaneously.

In testimony whereof I affix my signature in presence of two witnesses.

RICHARD PETER DECKER.

Witnesses:
J. P. WILLIAMSON,
Mrs. J. P. WILLIAMSON.